(12) United States Patent
Shimamoto et al.

(10) Patent No.: US 7,745,615 B2
(45) Date of Patent: Jun. 29, 2010

(54) CELLULOSE ESTER AND PRODUCTION METHOD THEREOF

(75) Inventors: Shu Shimamoto, Himeji (JP); Akihiro Higuchi, Himeji (JP)

(73) Assignee: Daicel Chemical Industries, Ltd., Osaka (JP)

(*) Notice: Subject to any disclaimer, the term of this patent is extended or adjusted under 35 U.S.C. 154(b) by 411 days.

(21) Appl. No.: 11/663,334

(22) PCT Filed: Sep. 21, 2005

(86) PCT No.: PCT/JP2005/017403

§ 371 (c)(1), (2), (4) Date: Mar. 21, 2007

(87) PCT Pub. No.: WO2006/033362

PCT Pub. Date: Mar. 30, 2006

(65) Prior Publication Data

US 2009/0043088 A1    Feb. 12, 2009

(30) Foreign Application Priority Data

Sep. 22, 2004 (JP) ............................. 2004-275759
Dec. 1, 2004 (JP) ............................. 2004-348995

(51) Int. Cl.
*C08B 3/00* (2006.01)
*C08B 3/06* (2006.01)
*G02B 5/30* (2006.01)
*G02B 1/04* (2006.01)
*G02B 1/08* (2006.01)

(52) U.S. Cl. ........................... 536/63; 536/69; 536/124; 353/20; 349/96

(58) Field of Classification Search ............... 536/63, 536/69; 353/20; 349/96
See application file for complete search history.

(56) References Cited

U.S. PATENT DOCUMENTS 1,330,543 A * 2/1920 Levey .................... 536/72
2004/0024198 A1 * 2/2004 Shibata et al. ........... 536/69

FOREIGN PATENT DOCUMENTS

| JP | 59-166501 A | 9/1984 |
|---|---|---|
| JP | 9-90101 A | 4/1997 |
| JP | 10-45804 A | 2/1998 |
| JP | 11-5851 A | 1/1999 |
| JP | 2002-212338 A | 7/2002 |
| JP | 2002-265501 A | 9/2002 |
| JP | 2002-309009 A | 10/2002 |
| JP | 2002-338601 A | 11/2002 |
| JP | 2003-105129 A | 4/2003 |
| JP | 2003-201301 A | 7/2003 |
| JP | 2004-2883 A | 1/2004 |
| JP | 2005-154764 A | 6/2005 |
| JP | 2006-30937 A | 2/2006 |

* cited by examiner

*Primary Examiner*—Shaojia Anna Jiang
*Assistant Examiner*—Jonathan S Lau
(74) *Attorney, Agent, or Firm*—Birch, Stewart, Kolasch & Birch, LLP

(57) ABSTRACT

Cellulose ester and film thereof useful for remarkably improving optical properties, e.g., optical isotropy. The cellulose ester has a degree of substitution from 2.90 to 2.965, a total of degrees of substitution at 2- and 3-positions $\geqq 1.97$, and a half height width of chemical composition expressed in degree of substitution of $\geqq 0.09$. The cellulose ester maybe produced by (i) acylating a cellulose with an acylating agent in the presence of a sulfuric acid catalyst, and (ii) hydrolyzing the acylated product in the presence of a sulfuric acid catalyst, wherein the acylation carried out with 1.40 to 2.0 molar equivalents of the acylating agent relative to 1 mol of a hydroxyl group in the cellulose in the presence of 6.5 to 9.5 parts by weight of the sulfuric acid catalyst relative to 100 parts by weight of the cellulose in the acylating step (i).

11 Claims, No Drawings

CELLULOSE ESTER AND PRODUCTION METHOD THEREOF

TECHNICAL FIELD

The present invention relates to cellulose ester useful for forming a film (particularly, an optical film such as a polarizer protective film, a color filter, or a film of a photosensitive photographic material), and a production method thereof, as well as a film comprising the cellulose ester.

BACKGROUND ART

Cellulose ester has been utilized as a supporter (or a base material) of a photosensitive photographic material, a polarizer protective film of liquid crystal displays (LCDs), a retarder film, a color filter, and others due to the excellent optical properties. In such an optical film, there has been also investigated on an affect of acyl group to a substitution position in a glucose unit constituting cellulose ester.

Among such cellulose ester, cellulose acetate, particularly cellulose triacetate, has been widely used. Cellulose triacetate is particularly poor in solubility, and a practically usable solvent for dissolving cellulose triacetate has been substantially limited to methylene chloride. Further, solubility changes depending on a degree of substitution of cellulose acetate. Therefore, even in the case of using methylene chloride as the solvent, there has been used a cellulose acetate having a degree of substitution (total of degrees of substitution) of 2.7 to 2.9 and acetic acid content of 59 to 61%. That is, the cellulose triacetate in which almost all hydroxyl groups are acylated, i.e., the cellulose triacetate which is close to a tri-substituted product having a degree of substitution of larger than 2.9, could not be practically used in the view of solubility.

For example, Japanese Patent Application Laid-Open 5851/1999 (JP-11-5851A, Patent Document 1) discloses films which comprise a cellulose acetate having a total of degrees of substitution of acetyl groups at 2-, 3- and 6-positions of not less than 2.67 (e.g., not less than 2.77) and having a total of degrees of substitution of acetyl groups at 2- and 3-positions of not more than 1.97. This document describes that use of the cellulose acetate ensures preparation of a stable solution by a cooling dissolution method even in the case of using a non-halogen solvent and enables production of a film having a low retardation value in the thickness direction and being suitable for a polarizer protective film by a flow-casting.

Japanese Patent Application Laid-Open No. 212338/2002 (JP-2002-212338A, Patent Document 2) discloses a cellulose acylate in which substitution degrees of acyl groups at 2- and 3-positions are in the range of 1.70 to 1.90 in total and a substitution degree of acyl group at 6-position is not less than 0.88, and a film thereof. Japanese Patent Application Laid-Open No. 265501/2002 (JP-2002-265501A, Patent Document 3) discloses a cellulose acylate in which substitution degrees of acyl groups at 2-, 3- and 6-positions are not less than 2.67 in total, substitution degrees of acyl groups at 2- and 3-positions are not more than 1.97 in total, and the following formula: $-0.1 \leq [(\text{a degree of substitution of acyl group at 3-position}) - (\text{a degree of substitution of acyl group at 2-position})] \leq 0.3$ is satisfied. This document also discloses a cellulose acylate in which substitution degrees of acyl groups at 2- and 3-positions are 1.70 to 1.90 in total, a substitution degree of acyl group at 6-position is not less than 0.88, and the following formula: $-0.1 \leq [(\text{a degree of substitution of acyl group at 3-position}) - (\text{a degree of substitution of acyl group at 2-position})] \leq 0.3$ is satisfied. These documents mention that cellulose acylate solution which is excellent in stability with time and has a low viscosity in a practical concentration region can be obtained and that a film having a high surface smoothness can be obtained by flow-casting the solution.

Japanese Patent Application Laid-Open No. 309009/2002 (JP-2002-309009A, Patent Document 4) discloses a cellulose acylate film which comprises a mixed polymer comprising a cellulose acylate in which substitution degrees of acyl groups at 2- and 3-positions are 1.7 to 1.95 in total and a substitution degree of acyl group at 6-position is not less than 0.88, and a cellulose acylate in which substitution degrees of acyl groups at 2- and 3-positions are 1.7 to 1.95 in total and a substitution degree of acyl group at 6-position is less than 0.88. Japanese Patent Application Laid-Open No. 105129/2003 (JP-2003-105129A, Patent Document 5) discloses a cellulose acylate film which comprises a cellulose acylate in which substitution degrees of acyl groups are 2.7 to 2.9 in total, substitution degrees of acyl groups having 3 to 22 carbon atoms are 0.4 to 2.5 and a substitution degree of acyl group at 6-position is less than 0.9, and a cellulose acylate in which substitution degrees of acyl groups are 2.75 to 2.9 in total, substitution degrees of acyl groups having 3 to 22 carbon atoms are 0.0 to 0.4 and a substitution degree of acyl group at 6-position is not less than 0.9. Use of these cellulose acylates ensures a dope which is high in solubility and low in solution viscosity.

Japanese Patent Application Laid-Open No. 338601/2002 (JP-2002-338601A, Patent Document 6) discloses a process for preparation of a cellulose acetate which comprises the steps of: reacting a cellulose in a solvent with acetic acid or acetic anhydride in the presence of a catalyst to synthesize a cellulose acetate; and ripening the synthesized cellulose acetate in the presence of a catalyst, an acetyl donor, and water or an alcohol, and under a condition that the amount of water and the alcohol is in the range of 0.1 to 10 mol % based on the amount of the acetyl donor (claim 1); a cellulose ester in which the degrees of acetyl substitution at 2-, 3- and 6-positions satisfy the following formulae: $2DS+3DS>1.80$, $3DS<2DS$, and $6DS>0.80$, in which 2DS is the degree of acetyl substitution at 2-position, 3DS is the degree of acetyl substitution at 3-position, and 6DS is the degree acetyl substitution at 6-position (claim 4). For example, in Example 15, a cellulose acetate satisfying $2DS=0.973$, $3DS=0.967$, and $6DS=0.967$ is obtained. This document describes that a total of degrees of substitution of acetyl groups at 2- and 3-positions and a degree of substitution of acetyl group at 6-position can be adjusted, and in addition, a degree of substitution of acetyl group at 2-position and a degree of substitution of acetyl group at 3-position can be adjusted; a solubility in an organic solvent and a viscosity of a dope can be controlled; and a film excellent in optical properties can be obtained.

Thus, various attempts have been made so that to adjust a degree of acyl group as a substituent may improve optical properties of a cellulose ester film (particularly a cellulose acetate film), and further improvement in the optical properties (particularly optical isotropy) has been required. Moreover, attempts for improving solubility or stability of the solution have been made in the case of using a general non-halogen solvent without using a halogen-containing solvent such as methylene chloride.

On the other hand, recently, in a liquid crystal drive system of liquid crystal displays, to use VA (Vertically Aligned) mode or OCB (Optically Compensated Bend) mode in place of TN (Twisted Nematic) mode is being attempted. The VA mode is suitable for display apparatus (or device) such as a flat panel display because of no optical leakage and excellent black. Moreover, the OCB mode is advantageously applicable for a flat panel display, particularly, a flat television, since the response speed is fast. However, in the liquid crystal drive system, use of the VA mode or the OCB mode in place of the TN mode has caused new problems. That is, in the VA mode or the OCB mode, birefringence is utilized for polarization rotation and polarization control is completed by disposing a polarization-controlling element on the light path. Therefore, there are some problems in use of a film having a large retardation (e.g., an in-plane retardation (Re)) such as current cellulose triacetate (TAC) film. In particular, with respect to a polarizer protective film, since such a protective film is disposed behind retardation film or a widen viewing angles (or viewing angle compensator) film (a WV film) in terms of light path in the side of the front surface, it is impossible to ensure optical compensation. As a result, there is a problem that the Re of the protective film is directly reflected in image quality of the display. Therefore, a protective film having a low retardation (particularly, a thickness retardation (Rth)) compared with the current TAC film is required.

Moreover, in a liquid crystal application for a large-screen television, there is a technical problem called "frame phenomenon". That is, in the case where shock of temperature and humidity entail an action of a stress on a TAC film, phase difference is increased by change of retardation and accordingly optical leakage is generated. In a television which is a home electric appliance, it is also important to improve durability. Therefore, it is necessary to inhibit change of retardation even in the case where temperature and humidity are changed. To that end, of course it is advantageous to use a protective film having a low retardation value.

[Patent Document 1] JP-11-5851A (Claims, paragraph number [0005])

[Patent Document 2] JP-2002-212338A (Claims, paragraph number [0007])

[Patent Document 3] JP-2002-265501A (Claims)

[Patent Document 4] JP-2002-309009A (Claims)

[Patent Document 5] JP-2003-105129A (Claims)

[Patent Document 6] JP-2002-338601A (Claims, Examples)

DISCLOSURE OF THE INVENTION

Problems To Be Solved By The Invention

It is therefore an object of the present invention to provide a cellulose ester useful for remarkably improving optical properties such as optical isotropy (for remarkably reducing a retardation value).

It is another object of the present invention to provide a cellulose ester [particularly, a cellulose acetate (a cellulose triacetate)] which can remarkably improve optical isotropy and is also excellent in solubility in a solvent (for example, a chlorine-containing organic solvent such as methylene chloride) or filtration property.

It is still another object of the present invention to provide a method for conveniently and efficiently producing a cellulose ester useful for obtaining a film (an optical film) remarkably excellent in optical properties (e.g., optical isotropy).

It is a further object of the present invention to provide a film which is applicable (adoptable) for a molding process (e.g., flow-casting) using a solvent (for example, a chlorine-containing organic solvent such as methylene chloride) and is remarkably excellent in optical properties (e.g., optical isotropy), particularly, an optical film such as a viewing angle compensation film for liquid crystal displays or a polarizer protective film.

Means To Solve The Problems

The inventors of the present invention made intensive studies to achieve the above objects and finally found that, in preparation of a cellulose ester obtained through steps such as acylation and hydrolysis (or saponification or ripening), a cellulose ester having a high degree of substitution and a remarkably narrow composition distribution expressed in degree of substitution is obtained by adjusting or selecting a reaction condition such as a content of a sulfuric acid catalyst for acylation (particularly, acetylation), a content of a sulfuric acid catalyst for hydrolysis (ripening) or a content of an aqueous solvent (particularly, water) for hydrolysis (ripening). The inventors of the present invention also found that a cellulose ester having a high degree of substitution obtained by such a method can be molded (formed into a film) by a solvent cast (e.g., a band casting) without deterioration in solubility, and the cellulose ester can impart remarkably high optical properties (particularly, optical isotropy) to a film such as an optical film. The present invention was accomplished based on the above findings.

That is, the cellulose ester of the present invention has a degree of substitution (or a total of degrees of substitution) of 2.900 to 2.965, a total of degrees of substitution at 2- and 3-positions of not less than 1.97, and a half height width of chemical composition expressed in degree of substitution of not more than 0.07. The half height width of chemical composition (or substitution distribution) can be usually determined as a correcting value Z based on a correction formula represented by the following formula (1):

$$Z=(X^2-Y^2)^{1/2} \qquad (1)$$

In the formula, X represents a half height width of chemical composition (non-correcting value) determined by a predetermined measuring apparatus and measurement condition, and Y represents a half height width of chemical composition of a cellulose ester having a degree of substitution of 3 determined by the same measuring apparatus and measurement condition as those in the above X.

The cellulose ester is usually a cellulose acylate (a cellulose triacylate), and particularly, may be a cellulose acetate (that is, a cellulose triacetate). The representative examples of the cellulose ester may include the following cellulose ester, and others.

A cellulose ester in which the degree of substitution is from 2.910 to 2.963, the total of degrees of substitution at 2-and 3-positions is not less than 1.973, and the half height width of chemical composition expressed in degree of substitution is not more than 0.065.

A cellulose ester which is a cellulose acetate, and in which the degree of substitution is from 2.915 to 2.962, the total of degrees of substitution at 2- and 3-positions is not less than 1.975, and the half height width of chemical composition expressed in degree of substitution is not more than 0.060.

The cellulose ester of the present invention may be produced, in processes for producing cellulose ester comprising acylation, hydrolysis (or saponification or ripening) and other processing, by adjusting a content of a sulfuric acid catalyst or that of an acylating agent and other conditions in a system. In an embodiment, the cellulose ester of the present invention may be produced by a method which comprises (i) an acylating step for acylating a cellulose with an acylating agent in the presence of a sulfuric acid catalyst, and (ii) a hydrolyzing step for hydrolyzing the acylated product in the presence of a sulfuric acid catalyst. In the acylating step (i), the amount of the sulfuric acid catalyst is from 6.5 to 9.5 parts by weight relative to 100 parts by weight of the cellulose, and the amount of the acylating agent is from 1.40 to 2.0 molar equivalents relative to 1 mol of a hydroxyl group in the cellulose.

As mentioned above, the cellulose ester of the present invention may be obtained by at least precisely adjusting the amount of the sulfuric acid catalyst and that of the acylating agent in the acylating step (i). In order to obtain the cellulose ester further efficiently, the amount of the sulfuric acid catalyst or that of the aqueous solvent in the hydrolyzing step (ii) maybe further precisely adjusted. For example, the hydrolyzing step (ii) may at least comprise (ii-1) an initial hydrolyzing step for hydrolyzing the acylated product in the presence of not more than 3 parts by weight of the sulfuric acid catalyst relative to 100 parts by weight of the cellulose and in the presence of 4 to 9 mol of an aqueous solvent relative to 100 mol of an organic carboxylic acid corresponding to the acylating agent. Moreover, in the initial hydrolyzing step (ii-1), the hydrolysis may be conducted for not shorter than 20 minutes from initiation of the hydrolysis reaction.

In the production method, the typical production method of a cellulose acetate is as follows.

A method for producing the cellulose ester (the cellulose acetate), which comprises (i) acetylating a cellulose in acetic acid with acetic anhydride in the presence of a sulfuric acid catalyst, and (ii) hydrolyzing the acetylated product in the presence of a sulfuric acid catalyst, wherein (1) in the acetylating step (i), the amount of the sulfuric acid catalyst is from 7 to 9.2 parts by weight relative to 100 parts by weight of the cellulose, and the amount of the acetic anhydride is from 1.45 to 1.9 molar equivalents relative to 1 mol of a hydroxyl group in the cellulose, and (2) the hydrolyzing step (ii) at least comprises (ii-1) an initial hydrolyzing step for hydrolyzing the acetylated product in the presence of not more than 2.5 parts by weight of the sulfuric acid catalyst relative to 100 parts by weight of the cellulose and in the presence of 4.5 to 8 mol of water relative to 100 mol of the acetic acid for not shorter than 30 minutes from initiation of the hydrolysis reaction.

A method for producing the cellulose ester (the cellulose acetate), which comprises (i) acetylating a cellulose in acetic acid with acetic anhydride in the presence of a sulfuric acid catalyst, partially neutralizing the sulfuric acid catalyst by addition of a basic aqueous solution, and (ii) hydrolyzing the acetylated product in the presence of a sulfuric acid catalyst, wherein (1) in the acetylating step (i), the amount of the sulfuric acid catalyst is from 7.5 to 9 parts by weight relative to 100 parts by weight of the cellulose, and the amount of the acetic anhydride is from 1.5 to 1.8 molar equivalents relative to 1 mol of a hydroxyl group in the cellulose, and (2) the hydrolyzing step (ii) at least comprises (ii-1) an initial hydrolyzing step for hydrolyzing the acetylated product in the presence of 0.8 to 2.4 parts by weight of the sulfuric acid catalyst relative to 100 parts by weight of the cellulose and in the presence of 5.5 to 7.5 mol of water relative to 100 mol of the acetic acid for 30 minutes to 2 hours from initiation of the hydrolysis reaction.

The cellulose ester of the present invention is remarkably excellent in optical properties such as optical isotropy, and in addition, has solubility in a solvent (e.g., a halogen-containing solvent such as methylene chloride) and also excellent in filtration property. Accordingly, the cellulose ester is useful for comprising (forming) a film such as an optical film. Therefore, the present invention also includes a cellulose ester film comprising the cellulose ester. Such a cellulose ester film may be a cellulose ester film in which the cellulose ester possesses a thickness retardation of −20 nm to +10 nm when measured as a film with a thickness of 80 μm containing no plasticizer. Moreover, in particular, such a cellulose ester film may be an optical film, particularly, a viewing angle compensation film for liquid crystal displays, or a polarizer protective film.

Throughout this specification, the term "bonded sulfuric acid" means a sulfuric acid bonded to a cellulose (a bonded sulfuric acid component which is bonded to a cellulose as a sulfuric acid group (e.g., a sulfate ester) or a sulfonic acid group). The term "total sulfuric acid" means a total of a bonded sulfuric acid, a free sulfuric acid and other sulfuric acid, and sometimes refers to as the term "residual sulfuric acid", "residual sulfuric acid component" or simply "sulfuric acid". Moreover, the term "residual sulfuric acid" is used (i) in a reaction system, not containing a sulfuric acid corresponding to a sulfate salt (or a precipitated sulfate salt) neutralized by addition of a base but containing a free sulfuric acid and a bonded sulfuric acid. Moreover, the term "residual sulfuric acid" is used (ii) in the case of using for a cellulose ester as a product, as a meaning containing a sulfuric acid ($H_2SO_4$) corresponding to a bonded sulfuric acid, a free sulfuric acid, a sulfate salt neutralized by addition of a base, and others.

Moreover, throughout this specification, the term "hydrolysis (hydrolyzing)" or "hydrolyzing step" means that after acylation of a cellulose, water, a water (or aqueous) solution (e.g., a water solution of water and an organic carboxylic acid) and/or a base (usually, a base in the form of a water solution) is added, and an acylation agent is hydrolyzed by the added water and a sulfuric acid catalyst (or a residual sulfuric acid catalyst) in the reaction system, then, in the presence of water and the sulfuric acid catalyst, deacylation and hydrolysis of a sulfate is conducted. That is, in the "hydrolysis reaction" of the hydrolyzing step, it seems that deacylation reaction and hydrolysis reaction of a sulfate competitively proceed each other. Therefore, throughout this specification, the terms "deacylation", "ripening" and "hydrolysis of a sulfate" are sometimes used as the same meaning as the term "hydrolysis", and sometimes used as a meaning of containing the term "deacylation and hydrolysis of a sulfate".

Further, throughout this specification, the phrase "initiation of hydrolysis reaction" or "initiation of reaction in hydrolyzing step" means that hydrolysis (deacylation and hydrolysis of a sulfate) is started in the presence of water by adding water or a base (or a basic aqueous solution). The "hydrolysis reaction" is often started with terminating the acylation reaction, or started after terminating the acylation reaction and raising a temperature to a predetermined hydrolysis temperature (e.g., 20 to 90° C.). The phrase "termination of acylation reaction" is sometimes used synonymous with the "initiation of hydrolysis reaction". Moreover, the phrase "termination of hydrolysis reaction" or "termination of reaction in hydrolyzing step" means to completely neutralize a sulfuric acid remaining in the reaction system (a residual sulfuric acid) with an excessive amount of a base. Moreover, the term "raw cellulose" means a raw cellulose before acylation. The amount of the sulfuric acid catalyst added for acylation usually survives without change until addition of the base.

EFFECTS OF THE INVENTION

Since the cellulose ester of the present invention [particularly, a cellulose acetate (a cellulose triacetate)] has a high substitution degree and a remarkably narrow half height width of chemical composition expressed in degree of substitution, the cellulose ester is useful for significantly improving optical properties such as optical isotropy (for example, significantly reducing a retardation value). Moreover, the cellulose ester of the present invention (particularly a cellulose acetate) can remarkably improve optical isotropy and is excellent in solubility in a solvent (for example, a chlorine-containing organic solvent such as methylene chloride) or filtration property, and others. In particular, according to the present invention, the cellulose ester has a remarkably narrow half height width of chemical composition even in the case of having a high substitution degree. Although a cellulose acetate having a high substitution degree is usually poor in solubility, the cellulose ester of the present invention is moldable by a flow-casting method which comprises dissolving in a solvent (e.g., methylene chloride). Such a cellulose ester ensures both a remarkably high optical isotropy and solubility (or moldability).

Further, according to the present invention, in a preparation of a cellulose ester, a cellulose ester useful for obtaining a remarkably excellent film in optical properties such as optical isotropy (an optical film) can be conveniently and efficiently produced by adjusting a content of a sulfuric acid catalyst for acylation (particularly acetylation), a content of a sulfuric acid catalyst for a hydrolyzing step (ripening), a content of an aqueous solvent (particularly, water), or others.

Moreover, the film of the present invention (particularly, an optical film such as a viewing angle compensation film for liquid crystal displays or a polarizer protective film) can be formed from the above-mentioned cellulose ester. Accordingly, the film can be formed (or molded) by applying a forming (or molding) process using a solvent (for example, a chlorine-containing organic solvent such as methylene chloride) (e.g., flow-casting). In addition, the film is remarkably excellent in optical properties (e.g., optical isotropy).

DETAILED DESCRIPTION OF THE INVENTION

The cellulose ester of the present invention is high in not only (i) a degree of substitution of acyl groups at 2-, 3- and 6-positions of a cellulose (or a degree of substitution of total acyl groups, hereinafter, sometimes simply referred to as a degree of substitution) but also (ii) a total of degrees of substitution at 2-and 3-positions (hereinafter, sometimes simply referred to as degrees of substitution at 2- and 3-positions). In addition, the cellulose ester is remarkably small in (iii) a half height width of chemical composition expressed in degree of substitution.

That is, in the cellulose ester of the present invention, firstly, (i) birefringence is reduced by increasing degrees of substitution at 2-, 3-and 6-positions of the cellulose (making the total degrees not less than 2.900). Specifically, since polarizability anisotropy of an acyl group or ester carbonyl bond (in particular, acetyl group) constituting the cellulose ester acts to an aspect in which polarizability anisotropy of the cellulose main chain is cancelled, optical isotropy of a film formed from the cellulose ester can be enhanced by increasing the total of degrees of substitution. However, in the case where the total degrees of substitution are too high, solubility of the cellulose ester is deteriorated probably because the cellulose ester crystal is stable. Accordingly, since it is difficult to dissolve the cellulose ester even in a halogen-containing solvent such as methylene chloride, the moldability (film-formability) of the cellulose ester is deteriorated. In addition, it is difficult to improve optical isotropy of a film formed from the cellulose ester. In the cellulose ester, an acyl group at 2- or 3-position (particularly, acetyl group) is higher in polarizability anisotropy than an ester carbonyl bond at 6-position, and has higher action for negating polarizability anisotropy of the cellulose main chain.

Therefore, in the present invention, further, (ii) by increasing degrees of substitutions of acyl groups at 2- and 3-positions in a cellulose, the cellulose ester is improved in optical isotropy while overcoming the problem of solubility caused by increasing a total of degrees of substitution (that is, while keeping or maintaining solubility of the cellulose ester).

However, even in the case where the degrees of substitution at 2- and 3-positions are high as mentioned above, the cellulose ester is sometimes insufficient in solubility. That is, the degree of substitution of the cellulose ester is "average degree of substitution", and the cellulose ester usually contains the different degree of substitution of cellulose esters and part of them is higher than the above average range (for example, a cellulose ester in which a degree of substitution is close to 3). The cellulose ester in which the degree of substitution is close to 3 is hard to dissolve. In the present invention, further, (iii) by making a half height width of chemical composition expressed in degree of substitution enough narrow (that is, by making a proportion of a cellulose ester having a high degree of substitution decreasing), even in the case where the cellulose ester contains a cellulose ester having a high degree of substitution, the influence of such a cellulose ester having a high degree of substitution is decreased, and the solubility can be maintained or imparted.

Thus, in the present invention, the cellulose ester can be remarkably improved in optical isotropy while maintaining solubility by precisely adjusting a combination of the degree of substitution and the half height width of chemical composition in the cellulose ester.

Hereinafter, the cellulose ester of the present invention will be described in detail.

The cellulose ester of the present invention comprises a cellulose ester having an acyl group (for example, an aliphatic acyl group having not less than 2 of carbon atoms) or others. The representative examples of the cellulose ester may include a cellulose ester having a $C_{1-10}$acyl group (an alkylcarbonyl group), for example, a cellulose acylate [e.g., a cellulose $C_{2-6}$acyl ester such as a cellulose acetate, a cellulose propionate or a cellulose butyrate (a cellulose $C_{2-6}$acylate), and a cellulose acetate $C_{3-6}$acylate such as a cellulose acetate propionate or a cellulose acetate butyrate (an aliphatic mixed acid ester)]. The preferred cellulose ester includes a cellulose $C_{2-4}$acyl ester (particularly, a cellulose acetate) or a cellulose acetyl $C_{3-4}$acyl ester (particularly, a cellulose acetate propionate, and a cellulose acetate butyrate). In the optical film field, a cellulose acetate excellent in various properties (that is, a cellulose triacetate) is used in many cases. These cellulose esters may be used singly or in combination.

In the cellulose ester of the present invention, the degree of substitution (the total of degrees of substitution of acyl groups at 2-, 3- and 6-positions of a glucose unit constituting a cellulose) may be from 2.900 to 2.965, preferably from 2.910 to 2.963, more preferably from 2.915 to 2.962, and particularly from 2.920 to 2.961 (e.g., from 2.921 to 2.960). In the case where the degree of substitution is too high compared with the above range, as described later, the cellulose ester is sometimes hard to dissolve even if the degrees of substitution at 2- and 3-positions are enough high and the half height width of chemical composition is enough narrow.

In the cellulose ester of the present invention, the degrees of substitution at 2- and 3-positions of a glucose unit (the total of average degree of substitution of acyl groups at 2- and 3-positions) may be not less than 1.97 (e.g., from 1.97 to 2), preferably not less than 1.973 (e.g., from 1.973 to 1.995), more preferably not less than 1.975 (e.g., from 1.975 to 1.99), and particularly not less than 1.98 (e.g., from 1.98 to 1.985).

In the cellulose acetate, all of acyl groups are acetyl group in many cases. As far as the acyl group does not have an effect on optical isotropy and others, the cellulose acetate may be a cellulose acetate having a minute amount of an acyl group except acetyl group (for example, propionyl group, and butylyl group). Therefore, in the cellulose acetate, the proportion of the acetyl group relative to the all acyl groups may be not less than 98 mol % (e.g., from 98.5 to 100 mol %), preferably not less than 99 mol % (e.g., from 99.3 to 99.95 mol %), and more preferably not less than 99.5 mol % (e.g., from 99.8 to 99.9 mol %).

The acetic acid content (acylation degree) may be measured by a conventional method. For example, the acetic acid content (acetylation degree) may be calculated by measuring the number of moles of acyl groups per unit weight in accordance with an acetic acid content in ASTM: D-817-91 (test method for a cellulose acetate and others) and measuring the ratio of each of saponified free acyl groups with the use of a liquid chromatography. The acetic acid content may be also analyzed by a $^1$H-NMR or a $^{13}$C-NMR.

In the cellulose ester of the present invention, the half height width of chemical composition expressed in degree of substitution (or half height width of substitution distribution) is as remarkably narrow as not more than 0.07 (e.g., from 0.01 to 0.07), preferably not more than 0.065 (e.g., from 0.02 to 0.063), more preferably not more than 0.06 (e.g., from 0.025 to 0.058) and particularly not more than 0.055 (e.g., from 0.03 to 0.05). The term "half height width" refers to a full width of a bandpass at half of the maximum of a peak to composition, and in this plot, the substitution axis (x-axis) is a degree of substitution; the vertical axis (y-axis) is an abundance of composition, and is an index of dispersion of a chemical composition (or substitution distribution). That is, the term "with respect to degree of substitution" means that the degree of substitution is defined as a unit of x-axis. For example, when the degree of substitution corresponding to half of the maximum of a peak is 2.6 and 2.8 with respect to degree of substitution (total of degrees of substitution) as a unit of x-axis, the half height width expressed in degree of substitution is 2.8−2.6=0.2.

Such a half height width of chemical composition may be determined by a high-performance liquid chromatography (HPLC) analysis. That is, the half height width of chemical composition of the cellulose ester of the present invention may be determined by HPLC-analyzing a plurality of cellulose esters having different degrees of substitution as standard samples with the use of a predetermined measuring apparatus under a predetermined measurement condition, and preparing a calibration curve from the analytical values of these standard samples [a curve indicating a relationship between an abundance of a cellulose ester and a degree of substitution, usually, a curve of second degree (particularly parabola)].

More specially, the half height width of chemical composition may be obtained by converting an abscissa (retention time) in the elution curve of a cellulose ester in a HPLC (reversed phase HPLC) measured under a predetermined treatment condition into a degree of substitution (0 to 3).

As the method for converting the retention time into the degree of substitution, for example, a method described in Japanese Patent Application Laid-Open No. 201301/2003 (JP-2003-201301A) (paragraph numbers [0037] to [0040]), and others may be utilized. For example, in order to convert the elution curve into the distribution curve of the degree of substitution (degree of intermolecular substitution), each of retention times of a plurality (e.g., not less than four) of samples with different degrees of substitution under the same measurement condition may be measured to give a conversion formula (transformation formula) for determining a degree of substitution (DS) from the retention time (T). That is, from the relationship between the retention time (T) and the degree of substitution (DS), a function of a calibration curve (usually, the following quadratic expression) is determined based on the least-squares method.

$$DS = aT^2 + bT + c$$

wherein DS represents a degree of ester substitution, T represents a retention time, each of "a", "b" and "c" represents a coefficient of the transformation formula (conversion formula).

In the distribution curve of the degree of substitution determined from the conversion formula as described above (the distribution curve of the degree of substitution of a cellulose ester plotted, in which the substitution axis (x-axis) is a degree of substitution and the vertical axis is an abundance of composition), to the peak top (E) corresponding to the observed degree of substitution, the half height width of chemical composition is determined as follows. That is, in the distribution curve, a straight line passing through (A) a base of the lower degree of substitution and (B) a base of the higher degree of substitution (baseline A-B) is drawn. Then, a line is dropped perpendicular to the x-axis from the peak top (E). The intersection of the perpendicular line and the baseline (A-B) is determined as (C), and the midpoint of the straight line (E-C) is determined as (D). The straight line through the midpoint (D) and parallel to the baseline (A-B) is drawn, and two intersections of the straight line and the distribution curve of the degree of substitution are determined as (A', B'). The width between the foot of a perpendicular dropped from the intersection (A') to the abscissa and that of a perpendicular dropped from the intersection (B') to the abscissa is determined as a half height width of the peak top.

Such a half height width of chemical composition reflects that the retention time varies depending on a degree of esterification in hydroxyl groups of glucose rings of a polymer chain of the cellulose ester in a sample. Therefore, the width of the retention time ideally indicates the width of composition distribution (with respect to degree of substitution). However, in a high-performance liquid chromatograph, a tube that does not contribute to distribution (for example, a guard column for protecting a column) is present. Accordingly, depending on constitution of a measuring apparatus, the width of the retention time often contains a margin of an error which is not ascribed to the width of the composition distribution. The error is, as described above, influenced by the column length, the internal diameter of the column, the distance from the column to the detector, the arrangement and others, and varies depending on the apparatus constitution.

Therefore, the half height width of chemical composition of the cellulose ester may be usually determined as a correcting value Z based on a correction formula represented by the following formula (1). In the case of using such a correction formula, more precise half height width of chemical composition can be determined as the same (almost the same) value even in a different measuring apparatus (and different measurement conditions) than that of the uncorrected value.

$$Z = (X^2 - Y^2)^{1/2} \qquad (1)$$

In the formula, X represents a half height width of chemical composition determined by a predetermined measuring apparatus and measurement condition (noncorrecting value), Y represents a half height width of chemical composition of a cellulose ester having a total of degrees of substitution of 3, where the Y is determined by the same measuring apparatus and measurement condition as those in the above X.

In the above-mentioned formula (1), the "cellulose ester having a degree of substitution of 3" refers to a cellulose ester in which all hydroxyl groups of a cellulose is esterified (for example, in a cellulose triacetate, a cellulose triacetate having an acetic acid content of 62.5%), and corresponds to a completely acylated cellulose (or an acylated cellulose which is not hydrolyzed) which is obtained by acylating a cellulose and not hydrolyzing the resulting matter. Practically (or ideally), such a cellulose ester has no half height width of chemical composition (that is, a cellulose ester having a half height width of chemical composition of zero).

The viscosity-average of polymerization of the cellulose ester of the present invention (particularly, a cellulose acetate) may be selected from the range of 100 to 1000 (e.g., 150 to 800), and for example, may be from 200 to 500 (e.g., from 230 to 450), preferably from 250 to 400 and more preferably from 270 to 380 (e.g., from 280 to 350).

The viscosity-average degree of polymerization may be determined in accordance with the intrinsic viscosity method of Uda et al. (kazuo Uda, and Hideo Saito, Journal of The Society of Fiber Science and Technology, Japan (Sen-i Gakkaishi), Vol. 18, No. 1, page 105 to 120, 1962). In this method, a solvent may be selected depending on the degree of acylation of a cellulose ester, and others. For example, in the case of a cellulose acetate (a cellulose triacetate), the test protocol is as follows. Dissolve a cellulose triacetate in a mixture of methylene chloride/methanol (9/1, by weight) at a predetermined concentration c (2.00 g/L). Then, inject the solution into an Ostward viscosimeter and measure the flow time (in seconds) "t" of the solution between the viscosimeter graduations at 25° C. On the other hand, measure the blank flow time (in seconds) "$t_0$" with the above solvent mixture in the same manner as the above and calculate the viscosity-average degree of polymerization by means of the following formula:

$$\eta_{rel} = t/t_0$$

$$[\eta] = (1n\eta_{rel})/c$$

$$DP = [\eta]/(6 \times 10^{-4})$$

wherein "t" shows a flow time (in seconds) of the solution, "$t_0$" shows a flow time (in seconds) of the solvent, "c" represents a cellulose triacetate concentration of the solution (g/L), $\eta_{rel}$ represents a relative viscosity, $[\eta]$ is an intrinsic viscosity, and DP is an average degree of polymerization.

When methylene chloride/methanol=9/1 (by weight) is used as the solvent mixture, for instance, the viscosity of a 6% by weight solution of cellulose triacetate may be 200 to 700 mPa·s, preferably 250 to 600 mPa·s, and particularly 250 to 500 mPa·s.

In the present invention, as mentioned later, an amount of a residual sulfuric acid in the cellulose ester can be relatively decreased. Therefore, an amount to be used of an alkaline earth metal compound (e.g., a calcium component) can be also reduced, and a film formed from the cellulose ester can be improved in optical properties (e.g., haze or yellowness index) accordingly. For example, in the cellulose ester of the present invention, the content of the calcium component (based on weight) is relatively decreased, and may be selected from the range of 10 to 130 ppm. For example, the content may be from 10 to 110 ppm (e.g., from 15 to 100 ppm), preferably from 20 to 90 ppm (e.g., from 25 to 80 ppm), and more preferably from 30 to 70 ppm (e.g., from 35 to 70 ppm, particularly from 40 to 65 ppm).

In order to improve heat resistance, cellulose ester commonly contains a metal component such as an alkali metal (e.g., potassium, and sodium) or an alkaline earth metal (e.g., calcium, magnesium, strontium, and barium). These metal components have a high affinity to a metal support, and considerably deteriorate releasability of a cast film from the metal support, and also deteriorate optical properties of the film. Although the detailed mechanism of this phenomenon is not clear, a residual sulfuric acid or a bonded sulfuric acid component (sulfate ester group or sulfonic acid group) is generated from a catalyst sulfuric acid in acylation of the cellulose, and the cellulose ester has a carboxyl group derived from the cellulose. Since the sulfate ester group or sulfonic acid group is an acidic group, remanence thereof accelerates saponification of the cellulose ester itself. Consequently, in the case where an alkali metal or alkaline earth metal as a heat stabilizer, particularly a calcium component (e.g., a calcium salt) is added to the cellulose ester to impart stability (particularly, heat resistance) as mentioned after, the sulfonic acid group and the carboxyl group form metal salts (e.g., calcium salts). However, these metal salts (e.g., calcium salts) enhance adhesiveness to the metal support and reduce releasability. Therefore, it is useful that the content of the metal component (e.g., a calcium component) is decreased as long as the stability is not deteriorated.

Further, to enhance stability of the cellulose ester and reduce adhesiveness to the metal support, the ratio of the chemical equivalent of the calcium relative to the chemical equivalent of the residual sulfuric acid (or total sulfuric acid, particularly a bonded sulfuric acid component) (chemical equivalent in terms of sulfuric acid) ($Ca/SO_4$ ratio) may be from 0.5 to 3.0, preferably from 1.0 to 2.8 and more preferably from 1.2 to 2.6 (e.g., from 1.3 to 2.5). In particular, the $Ca/SO_4$ ratio may be from 1.5 to 2.5 as far as the releasability is acceptable, or may be from 1.0 to 1.5 in the case where a problem concerning the releasability arises (for example, in the case where the amount of the total sulfuric acid is relatively large).

In the case where a problem concerning the releasability does not arise by adjusting the flow-casting rate of the cellulose ester, the $Ca/SO_4$ ratio preferably relatively large from the viewpoint of heat resistance, for example, may be from 1.5 to 3.0 and preferably 1.5 to 2.5. Moreover, in the case where a problem concerning the releasability arises, it is necessary to reduce the calcium content. The $Ca/SO_4$ ratio may be selected from the range of at least 0.5 (e.g., from 0.5 to 1.5), preferably at least 0.6 (e.g., from 0.6 to 1.2) and more preferably at least 0.7 (e.g., from 0.7 to 1.0) in the light of heat resistance.

The content of the metal (e.g., calcium) may be measured by completely burning a dried cellulose ester, dissolving the resulting ash in hydrochloric acid as a pretreatment, and then subjecting the pre-treated sample to the atomic absorption spectrometry. The measured value is obtained as the content of the metal in 1 gram of the cellulose ester in an absolute dry condition at ppm unit. The metal content may be determined by pre-treating an absolutely dried cellulose ester with Advanced Microwave Labstation (sulfonitric acid decomposition) and an alkali melting, and analyzing the pretreated matter with ICP-AES (inductively coupled plasma atomic emission spectrometer).

The chemical equivalent ratio [$Ca/SO_4$ ratio] of the calcium relative to the total sulfuric acid is calculated as a molar ratio of $Ca/SO_4$ from the calcium content and the amount of the sulfuric acid. Namely, by dividing the amount of the sulfuric acid by 96, the sulfuric acid content in 1 gram of the cellulose ester can be represented at mol unit. Moreover, by dividing the calcium content by 40.1, the calcium content in 1 gram of the cellulose ester can be represented at mol unit.

As described later, according to the present invention, the amount of the residual sulfuric acid in the cellulose ester (particularly, the amount of the bonded sulfuric acid) can be sufficiently reduced. For example, in the cellulose ester of the present invention, the amount of the residual sulfuric acid (based on weight) may be selected from the range of not more than 150 ppm (e.g., from 10 to 150 ppm), and for example, may be not more than 140 ppm (e.g., from 30 to 120 ppm), preferably not more than 110 ppm (e.g., from 35 to 100 ppm), and more preferably not more than 80 ppm (e.g., from 40 to 70 ppm).

The amount of the residual sulfuric acid (or the amount of the total sulfuric acid) may be determined by combusting a dried cellulose ester in an electric furnace at 1300° C., trapping the evolved sulfurous acid gas in hydrogen peroxide-water having a predetermined concentration, and titrating the hydrogen peroxide-water with a base having a predetermined concentration (e.g., a sodium hydroxide-water solution). The determined value is in terms of $SO_4^{2-}$, and is obtained as the sulfuric acid content in 1 gram of the cellulose ester in an absolute dry condition at ppm unit.

Since the cellulose ester of the present invention is remarkably reduced in birefringence, the cellulose ester is useful for preparing a film product having an extremely low retardation value in film formation. The intrinsic birefringence index ($\Delta n_0$) of the cellulose ester of the present invention is from −0.05 to 0.05 (e.g., from 0 to 0.08), preferably from 0.0 to 0.03, and more preferably from 0.001 to 0.01. In order to adjust the intrinsic birefringence index ($\Delta n_0$) to such a value, as described above, it is sufficient to control the degree of substitution, the degrees of substitution at 2- and 3-positions of the glucose unit, and half height width of chemical composition expressed in degree of substitution.

The following relationship is established among the refractive index (n), the birefringence ($\Delta n$) and the phase difference (the retardation in the plane (Re), the retardation of the thickness direction (Rth)). Incidentally, "x" represents a mechanical direction (x-axis), "y" represents a width direction (y-axis), "z" represents a thickness direction (z-axis), S represents a degree of orientation (0 to 1), $\Delta n_0$ represents an intrinsic birefringence, and "d" represents a thickness.

$$Re=[n_x-((n_y+n_z)/2)] \cdot d \doteqdot \Delta n_0 \cdot S \cdot d$$

$$Rth=[n_z-((n_x+n_y)/2)] \cdot d \doteqdot -\tfrac{1}{2} \cdot \Delta n_0 \cdot S \cdot d$$

As apparent from the above-mentioned relational expression, the cellulose ester of the present invention having a small intrinsic birefringence index can make the retardation value (Re, Rth) smaller at a high level by adjusting the degrees of orientation (S). In particular, according to the present invention, in a cellulose acetate (cellulose triacetate) having acetyl group which is remarkably stiff compared with other acyl group and is easy to reduce the retardation value, the retardation value can be reduced at a high level.

Moreover, in the cellulose ester of the present invention (e.g., the cellulose acetate), a yellowness index (YI) which is an index of yellowness of a cellulose ester may be from 1 to 7 (e.g., from 1 to 6) and preferably from 1 to 5 (e.g., from 2 to 4). The yellowness index (YI) may be measured according to the following manner.

Weigh exactly 12.0 grams of a cellulose ester, previously dried, add 88.0 grams of a solvent (e.g., a mixture solvent of methylene chloride/methanol (9/1, w/w) or acetone), and effect thorough dissolution (a sample solution in a concentration of 12% by weight). Using a color difference meter (Nippon Denshoku Kogyo Co., Ltd., Color Difference Meter Σ90) and a glass cell (45 mm wide, 45 mm high; light path length 10 mm), perform measurements and calculate YI by means of the following equation.

$$YI=YI2-YI1$$

wherein YI1 represents YI for the solvent, and YI2 shows YI for the 12% by weight sample solution.

Further, the haze value of the cellulose ester of the present invention (e.g., the cellulose acetate) may be from 1 to 5 (e.g., from 1 to 4) and preferably from 1 to 3.5 (e.g., from 2 to 3.5). The haze may be measured according to the following manner.

Using a turbidimeter (Nippon Denshoku Kogyo Co., Ltd.) and a glass cell (45 mm wide, 45 mm high; light path length 10 mm), perform measurements as follows. Put the same solvent as the above in the glass cell, set the cell in the turbidimeter, and perform zeroing and calibration. Then, put a 12% by weight sample solution prepared in the same manner as the above in the glass cell, set the cell in the turbidimeter, and record the reading.

The cellulose ester of the present invention is remarkably excellent in optical properties such as optical isotropy. Accordingly, the cellulose ester of the present invention is suitable for molding various molded articles (a one-dimensional molded article such as a fiber, a two-dimensional molded article such as a film, and a three-dimensional molded article), for example, a cellulose ester film. Moreover, the cellulose ester of the present invention (particularly the cellulose acetate) has solubility in spite of a high substitution degree. Therefore, the cellulose ester may be used to produce a film by a solvent cast method (or a film formation using solution) or others, and is useful for producing a cellulose ester film having a remarkably high optical isotropy (e.g., having a remarkably reduced retardation value) (particularly, a thin cellulose ester film) at a high productivity. In particular, since the above-mentioned cellulose acetate (that is, the cellulose triacetate) is remarkably narrow in half height width of chemical composition, the cellulose acetate has solubility in a solvent (e.g., a halogen-containing solvent such as methylene chloride) and is also excellent in filtration property and others in spite of a high substitution degree.

[Process for Producing Cellulose Ester]

Cellulose ester may be usually produced through a series of steps which comprises (i) an acylating step for acylating a cellulose with an acylating agent in the presence of a sulfuric acid catalyst, an optional step for partially neutralizing the sulfuric acid catalyst, and (ii) a hydrolyzing step [or (ii) a ripening step] for hydrolyzing (or saponifying, ripening) the acetylated product in the presence of a sulfuric acid catalyst (or a residual sulfuric acid). That is, the cellulose ester may be produced by optionally treating a cellulose, and acylating the cellulose with an acylating agent in the presence of a sulfuric acid catalyst, and optionally partially neutralizing the sulfuric acid catalyst, and hydrolyzing (or saponifying, ripening) the acylated product. More specifically, the cellulose ester may be usually produced through treating a cellulose with an organic carboxylic acid corresponding to an acyl group (e.g., acetic acid, propionic acid, butyric acid, particularly acetic acid) (treating step), preparing a triacyl ester (particularly, a cellulose triacetate) from the treated cellulose with an acylating agent (e.g., acetic anhydride, propionic anhydride, butyric anhydride, particularly, acetic anhydride) in the presence of a sulfuric acid catalyst (acylating step), decomposing (or destroying) the excessive amount of the acylating agent (particularly, an acid anhydride such as acetic anhydride), and adjusting the degree of acylation of the cellulose by hydrolyzing (or saponifying, ripening) (hydrolyzing step, ripening step, or saponifying and hydrolyzing step). A common production process of a cellulose ester may be referred to "Wood Chemistry (the first volume)" (Migita et al., issued by Kyoritsu Shuppan Co., Ltd. in 1968, pages 180 to 190).

According to the present invention, in a series of steps through the acylating step and the hydrolyzing (ripening) step as mentioned above, the cellulose ester can be obtained by precisely controlling or adjusting combination of the amount of the acylating agent or sulfuric acid catalyst in the acylating step, the amount of the sulfuric acid catalyst, the hydrolyzing condition and others in combination.

As the cellulose (pulp), a wood pulp (hardwood pulp, softwood pulp) or a cotton linter may be used. These celluloses may be used singly or in combination.

The treating step may be carried out by treating the cellulose by means of spraying the cellulose with an organic carboxylic acid or a hydrous organic carboxylic acid (acetic acid or hydrous acetic acid) or immersing the cellulose in an organic carboxylic acid or a hydrous organic carboxylic acid. The amount of the organic carboxylic acid (e.g., acetic acid) relative to 100 parts by weight of the cellulose may be from 10 to 100 parts by weight, preferably from 20 to 80 parts by weight and more preferably from 30 to 60 parts by weight.

(Acylating Step (i))

In the acylating step (i), the amount of the sulfuric acid catalyst as an acylation catalyst (hereinafter, sometimes simply referred to as a sulfuric acid) relative to 100 parts by weight of the cellulose (raw cellulose) may be usually selected from the range of 1 to 15 parts by weight, and may be usually from 5 to 15 parts by weight (e.g., from 5 to 12 parts by weight), preferably from 5 to 13 parts by weight and more preferably from 7 to 10 parts by weight.

The cellulose ester of the present invention has a high degree of substitution as described above, and the acylation (particularly acetylation) using a small amount of a sulfuric acid (low sulfuric acid) is necessary. Specifically, in the case where the amount of the sulfuric acid catalyst is increased, a sulfate ester group with which a hydroxyl group of the glucose ring is substituted is easily generated in the acylating step. Since this sulfate ester group is easy to be saponified in the hydrolyzing step and generate a hydroxyl group, the cellulose ester cannot have a high substitution degree in some cases. On the other hand, in order to narrow the above-mentioned half height width of chemical composition, the acylation (particularly acetylation) using a large amount of the sulfuric acid (high sulfuric acid) is effective. From such viewpoints, particularly, in order to efficiently obtain the cellulose ester having a high substitution degree and a narrow half height width of chemical composition, the acylation is conducted in the presence of the sulfuric acid catalyst in a proportion of 6.5 to 9.5 parts by weight, preferably 7 to 9.2 parts by weight and more preferably 7.5 to 9 parts by weight relative to 100 parts by weight of the cellulose.

The acylating agent may be an organic acyl halide such as acetyl chloride, and usually, a $C_{2-6}$alkanecarboxylic anhydride such as acetic anhydride, propionic anhydride or butyric anhydride may be used. These acylating agents (e.g., acid anhydrides) maybe used singly or in combination. The preferred acylating agent includes a $C_{2-4}$alkanecarboxylic anhydride, particularly, at least acetic anhydride. In the preferred embodiment, the cellulose is allowed to react with acetic anhydride for acetylation in the acylating step.

The amount of the acylating agent (e.g., acetic anhydride) in the acylating step (an esterifying step such as an acetylating step) may be from 1.40 to 2.0 molar equivalents (e.g., mol in an acid anhydride such as acetic anhydride), preferably from 1.45 to 1.9 molar equivalents and more preferably from 1.5 to 1.8 molar equivalents (e.g., from 1.5 to 1.7 molar equivalents) relative to 1 mol of the hydroxyl group of the cellulose.

In particular, in the case of using acetic anhydride as the acylating agent, the amount of acetic anhydride in the acetylating step may be from 264 to 377 parts by weight, preferably from 274 to 358 parts by weight and more preferably from 283 to 340 parts by weight (e.g., from 283 to 320 parts by weight) relative to 100 parts by weight of the cellulose.

According to the present invention, usually, the cellulose ester having a high substitution degree and a remarkably narrow half height width of chemical composition as described above can be obtained by adjusting the amount of the sulfuric acid catalyst and the amount of the acylating agent in combination as described above in the acylating step (i) (further, if necessary, by adjusting the amount of the sulfuric acid catalyst or aqueous solvent in the after-mentioned hydrolyzing step (ii)).

That is, in the acylating step (i), the cellulose is acylated (particularly acetylated) with a specific amount of the acylating agent [for example, 1.40 to 2.0 molar equivalents, preferably 1.45 to 1.9 molar equivalents and more preferably 1.5 to 1.8 molar equivalents (e.g., 1.5 to 1.7 molar equivalents) relative to 1 mol of the hydroxyl group of the cellulose] in the presence of a specific amount of the sulfuric acid catalyst (e.g., 6.5 to 9.5 parts by weight, preferably 7 to 9.2 parts by weight and more preferably 7.5 to 9 parts by weight of the sulfuric acid catalyst relative to 100 parts by weight of the cellulose) in many cases.

The acylating step is usually carried out in a solvent (or a diluent) in many cases. As such a solvent (or a diluent), an organic carboxylic acid (e.g., a $C_{2-6}$alkanecarboxylic acid such as acetic acid, propionic acid or butyric acid, in particular, an organic carboxylic acid corresponding to an acyl group, such as acetic acid) is used. The amount of the organic carboxylic acid (e.g., acetic acid) relative to 100 parts by weight of the cellulose is from 200 to 700 parts by weight, preferably from 300 to 600 parts by weight and more preferably from 350 to 500 parts by weight. The acylation reaction may be conducted in conventional conditions, for example, at a temperature of 0° C. to 60° C., preferably 5 to 55° C. and more preferably 15 to 50° C. (e.g., 20 to 45° C.). The reaction at a low temperature tends to lower the half height width of chemical composition.

By the acylation reaction as described above, the cellulose ester (a cellulose triacylate such as a cellulose triacetate (primary cellulose acetate)) can be produced. Then, after reaching a predetermined acyl content (particularly, an acetylation degree), the acylation reaction is stopped, and the cellulose ester is hydrolyzed (ripened or saponified) by utilizing the sulfuric acid component (or the residual sulfuric acid component) as a hydrolysis catalyst (or a ripening catalyst).

The stopping of the acylation reaction is carried out, as mentioned above, by adding water or water and a mixed solvent of an organic carboxylic acid (e.g., particularly an organic carboxylic acid corresponding to an acylating agent) to the reaction system, or adding a solution of a basic material in a water-based solvent (particularly a water solution) to destroy the acylating agent (particularly, an excessive amount of the acylating agent such as acetic anhydride) in many cases. According to the present invention, particularly, in the case of using a solution of a basic material in a water-based solvent (in particular, a basic aqueous solution) in the stopping of the acylation reaction (the destroying of the acylating agent), the content of the aqueous solvent (particularly, water) in the hydrolyzing step can be adjusted by the aqueous solvent (e.g., water and/or an alcohol, particularly water) present in the reaction system while decomposing (destroying) the acylating agent, and the sulfuric acid catalyst can be partially neutralized. Therefore, in the present invention, practically, for stopping the acylation reaction (or after the acylating step), the solution of a basic material in a water-based solvent (in particular, a basic aqueous solution) is added to partially neutralize the sulfuric acid component (and stop the acylation reaction), and the cellulose ester is subjected to the after-mentioned hydrolyzing step (ii).

The base may include an alkali metal compound, an alkaline earth metal compound, a compound containing the metal of the Group 13 of the Periodic Table of Elements, a transition metal compound, ammonia, and others. The alkali metal compound may include a hydroxide (e.g., sodium hydroxide, and potassium hydroxide), a carbonate (e.g., sodium carbonate, potassium carbonate, sodium hydrogen carbonate, and potassium hydrogen carbonate), and a salt of an organic acid (e.g., an acetate such as sodium acetate or potassium acetate). The alkaline earth metal compound may include a hydroxide (e.g., magnesium hydroxide, calcium hydroxide, strontium hydroxide, and barium hydroxide), a carbonate (e.g., magnesium carbonate, calcium carbonate, and calcium hydrogen carbonate), and a salt of an organic acid (e.g., an acetate such as magnesium acetate or calcium acetate). The compound containing the metal of the Group 13 of the Periodic Table of Elements may include a hydroxide of aluminum or others, a salt of an organic acid with the metal (e.g., an acetate), and others. Examples of the transition metal compound may include a hydroxide of a transition metal such as iron, copper or zinc, and a salt of an organic acid with the transition metal (e.g., an acetate). These bases maybe used singly or in combination. Among these bases, at least one base selected from the group consisting of the alkali metal compound and the alkaline earth metal compound is usually employed in many cases. In particular, a base selected from the group consisting of a sodium compound, a potassium compound, a magnesium compound and a calcium compound (preferably at least a magnesium compound and/or a calcium compound) is used in practical cases.

The base may be used in the form of a particulate, and is usually employed in the form of a liquid (e.g., an aqueous solvent solution, particularly, a water solution) in many cases. In the solution of a basic material in a water-based solvent (particularly, a water solution), examples of the water-based (or aqueous) solvent (a water-based (or aqueous) solvent constituting the solution of a basic material in a water-based solvent) may include water and an alcohol (e.g., a $C_{1-4}$alkanol such as methanol, ethanol, propanol or isopropanol) or others as described above. These aqueous solvents may be used singly or in combination. The preferred aqueous solvent includes water (water alone). In the solution of a basic material in a water-based solvent, the concentration of the base may be suitably adjusted depending on the content of the sulfuric acid or that of the aqueous solvent in the after-mentioned hydrolyzing step.

The amount of the base for partial neutralization may be adjusted depending on the amount of the sulfuric acid (the amount of the residual sulfuric acid) in the after-mentioned hydrolyzing reaction, and may be from 0.1 to 0.9 equivalent, preferably from 0.2 to 0.8 equivalent and more preferably from 0.3 to 0.7 equivalent (e.g., from 0.3 to 0.6 equivalent) relative to 1 equivalent of the sulfuric acid catalyst (the fed sulfuric acid catalyst) in the reaction system.

(Hydrolyzing Step (ii))

After the acylation reaction is stopped (and partially neutralized), the reaction system is subjected to the hydrolyzing step (ii). In the hydrolyzing step, the hydrolysis reaction and the hydrolysis reaction of the sulfate in the cellulose triacylate is carried out. According to the present invention, in the hydrolyzing step, the cellulose ester having a high degree of substitution and a narrow half height width of chemical composition as described above can be obtained by adjusting the content of the sulfuric acid as a catalyst and the content of the aqueous solvent in combination (after-mentioned initial hydrolyzing step).

The hydrolyzing step may be carried out by newly adding other acid catalyst, and may be usually carried out in the presence of the sulfuric acid catalyst used in the acylating step. The hydrolyzing step may be conducted in the presence of the sulfuric acid catalyst in a proportion of not more than 15 parts by weight (e.g., 0.5 to 12 parts by weight), preferably not more than 10 parts by weight (e.g., 0.8 to 8 parts by weight), more preferably not more than 5 parts by weight (e.g., 1 to 5 parts by weight) and particularly not more than 3 parts by weight (e.g., 1.2 to 2 parts by weight) relative to 100 parts by weight of the cellulose (raw cellulose).

In particular, to efficiently obtain the cellulose ester, the hydrolysis (or ripening) may be carried out by precisely adjusting the amount of the sulfuric acid within a relatively small amount. For example, the hydrolyzing step may be preferably conducted in the presence of the sulfuric acid catalyst in a proportion of not more than 3 parts by weight (e.g., 0.5 to 2.8 parts by weight), preferably not more than 2.5 parts by weight (e.g., 0.8 to 2.4 parts by weight), more preferably not more than 2.3 parts by weight (e.g., 1 to 2.2 parts by weight) and particularly not more than 2 parts by weight (e.g., 1.2 to 1.8 parts by weight) relative to 100 parts by weight of the cellulose(raw cellulose). In the acylation reaction, the hydroxyl group at 6-position of the glucose unit is easy to form a sulfate ester. The hydrolysis of the sulfate group proceeds in the presence of the sulfuric acid catalyst. The hydrolysis reaction is reversible, and the equilibrium moves toward hydrolysis of the sulfate in the case where the amount of the sulfuric acid is decreased. Accordingly, even in the case where the amount of the sulfuric acid is decreased as described above, the hydrolysis of the sulfate is not very decelerated. More specifically, even in such a low sulfuric acid condition, the hydrolysis of the sulfate proceeds at an enough reaction rate, and the hydrolysis reaction is selectively inhibited. Therefore, the cellulose ester having a high degree of substitution as described above, particularly, in a degree of substitution at 2- and 3-positions (in particular, a cellulose acetate, that is, a cellulose triacetate) can be efficiently produced while the amount of the sulfuric acid remaining in (and bonding to) the cellulose ester is reduced in a high level.

Moreover, the hydrolysis is usually carried out in the presence of the sulfuric acid catalyst and the aqueous solvent. Such an aqueous solvent may be derived from water used for destroying the excessive acylating agent and/or derived from the solution of a basic material in a water-based solvent used for partial neutralization as described above, or may be newly added in the hydrolysis. As the aqueous solvent, the same aqueous solvent as the above-mentioned may be exemplified, and water is usually employed in many cases.

The hydrolyzing step may be conducted in the presence of the aqueous solvent (particularly, water) in a proportion of 2 to 15 mol, preferably 3 to 12 mol and more preferably 4 to 10 mol relative to 100 mol of an organic carboxylic acid corresponding to the acylating agent (particularly acetic acid). The "organic carboxylic acid corresponding to the acylating agent" includes the solvent (or diluent) used in the acylation, a decomposition product of the acylating agent (e.g., acetic anhydride), and others.

In particular, to efficiently obtain the cellulose ester, the hydrolysis may be conducted by adjusting the amount of the aqueous solvent. For example, the hydrolyzing step may be suitably carried out in the presence of the aqueous solvent (particularly, water) in a proportion of 4 to 9 mol (e.g., 4.2 to 8.5 mol), preferably 4.5 to 8 mol (e.g., 5 to 7.8 mol), more preferably 5.5 to 7.5 mol (e.g., 5.8 to 7 mol) and particularly 6 to 6.8 mol relative to 100 mol of the organic carboxylic acid corresponding to the acylating agent (particularly, acetic acid). The hydrolysis (deacylation, particularly deacetylation) in the presence of the aqueous solvent in the above-mentioned range ensures to efficiently hydrolyze the sulfate group and narrow the half height width of chemical composition. In such a way, by precisely adjusting the amount of the aqueous solvent, the cellulose ester, particularly, the cellulose acetate, having a high degree of substitution (and a narrow half height width of chemical composition) can be efficiently obtained. In the hydrolyzing step, in the case where the content of the aqueous solvent is too low, the hydrolysis of the sulfate group is remarkably lengthy, and the hydrolysis of the sulfate group is insufficient. As a result, there is a possibility of deteriorating solubility or heat stability of the cellulose ester. Moreover, in the case where the content of the aqueous solvent is too high, similarly, not only the hydrolysis of the sulfate group is insufficient but also the half height width of chemical composition broadens out. Although it is not certain the reason why the composition distribution broadens out, it is considered that the high content of the aqueous solvent causes the heterogeneous reaction due to the microscopic phase separation of the cellulose ester or the lowering of the activity of the free sulfuric acid present in the reaction system.

As mentioned above, in the preferred embodiment of the hydrolyzing step (ii), to further efficiently obtain the cellulose ester having a high substitution degree and a remarkably narrow half height width of chemical composition, the amount of the sulfuric acid catalyst and that of the aqueous solvent are precisely adjusted. That is, the hydrolyzing step (ii) at least comprises an initial hydrolyzing step (ii-1) for hydrolyzing (or deacylating) the cellulose in the presence of the sulfuric acid catalyst in a specific proportion (e.g., not more than 3 parts by weight relative to 100 parts by weight of the cellulose) and in the presence of the aqueous solvent in a specific proportion (e.g., 4 to 9 mol relative to 100 mol of the organic carboxylic acid corresponding to the acylating agent). Such an initial hydrolyzing step (ii-1) is conducted for a time of not shorter than 20 minutes (e.g., 25 minutes to 3 hours), preferably not shorter than 30 minutes (e.g., 30 minutes to 2 hours) and more preferably 35 minutes to 1.5 hours (e.g., 40 to 60 minutes) from initiation of the hydrolysis reaction in many cases.

The hydrolyzing step (ii) may comprise the initial hydrolyzing step (ii-1) alone, or may comprises the initial hydrolyzing step (ii-1) and a late hydrolyzing step (ii-2). Such a late hydrolyzing step (ii-2) may be conducted under a different condition in aqueous solvent content from the initial hydrolyzing step (ii-1) by newly adding an aqueous solvent (particularly, water). In such a late hydrolyzing step (ii-2), the aqueous solvent content in the hydrolysis reaction system may be not necessarily in the above-mentioned range (4 to 9 mol relative to 100 mol of the organic carboxylic acid), and usually preferably within the above-mentioned range. For example, the late hydrolyzing step (ii-2) may be carried out in the presence of the aqueous solvent (particularly, water) in a proportion of 4 to 9 mol, preferably 5 to 8.8 mol and more preferably 6 to 8.5 mol relative to 100 mol of the organic carboxylic acid corresponding to the acylating agent.

As described above, in the acylation reaction, the hydroxyl group at 6-position of the glucose unit is easy to form a sulfate ester. On the other hand, as the content of the sulfate ester group is higher, the heat resistance or hydrolysis (or saponification) resistance of the produced cellulose ester is also easy to be deteriorated. Therefore, as long as the hydrolyzing step (ii-1) can be conducted in the hydrolyzing step, if necessary, in order to further reduce the concentration of the sulfate ester group, the hydrolysis (deacylation reaction and hydrolysis reaction of the sulfate) may be conducted by adding a predetermined amount of the base to the reaction system continuously or intermittently (or gradually) over multiple times for partial neutralization (the base addition for the stopping the acylation reaction is not contained). The base can be substantially continuously added in the form of a predetermined form (e.g., a liquid such as a water solution, and a powder) to the reaction system by dropwise or addition at a short interval. In the case where the base is added to reaction system in a divided stage, it is sufficient that the time of the base addition is plural. The time of the base addition may be not less than 3 (e.g., from 3 to 100), preferably not less than 4 (from 4 to 100) and more preferably not less than 5 (from 5 to 100). In order to conduct industrially advantageous hydrolysis, the time may be from 3 to 50 (e.g., from 3 to 20) and preferably from 4 to 25 (e.g., from 4 to 20).

The addition mode of the base is not particularly limited to a specific one. The base may be added to the reaction system continuously or intermittently; the amount to be added of the base is continuously or gradually reduced from the initial stage of the hydrolyzing step through the late stage thereof; or the amount to be added of the base is continuously or gradually increased from the initial stage of the hydrolyzing step through the late stage thereof. With regard to the addition of the base, the amount to be added of the base in the initial stage of the hydrolyzing step is usually larger than that in the late stage thereof in many cases.

In the case of adding the base (usually, a solution of a basic material in a water-based solvent) in the initial hydrolyzing step (ii-1), the hydrolyzing condition is maintained in the range (e.g., not more than 3 parts by weight of the sulfuric acid catalyst relative to 100 parts by weight of the cellulose, and 4 to 9 mol of the aqueous solvent relative to 100 mol of the organic carboxylic acid corresponding to the acylating agent) for the above-mentioned predetermined time (e.g., 25 minutes to 3 hours from initiation of the hydrolysis reaction).

The hydrolysis reaction (containing the deacylation reaction or saponification, and the initial hydrolyzing step (ii-1)) maybe carried out at a temperature of 20 to 90° C. (e.g., 50 to 90° C.), preferably 25 to 80° C. (e.g., 50 to 80° C.) and more preferably 30 to 70° C. (e.g., 50 to 70° C.). In the hydrolysis reaction, if necessary, other acid catalyst (a protonic acid, a Lewis acid) may be used. In a series of hydrolysis steps containing the initial hydrolysis step (ii-1), the residual sulfuric acid is usually employed as a catalyst in many cases. The hydrolysis reaction may be conducted in an inactive gas atmosphere or in an air atmosphere. In the hydrolysis step, the deacylation and the hydrolysis reaction of the sulfate seem to proceed competitively.

The total reaction time of the hydrolysis step (ii) may be in the range of not shorter than 20 minutes (e.g., from 25 minutes to 10 hours), and may be preferably from 30 minutes to 5 hours (e.g., from 40 minutes to 3 hours) and more preferably from 50 minutes to 2.5 hours (e.g., from 1 to 2 hours).

The hydrolysis can be stopped by completely neutralizing the sulfuric acid catalyst (or residual sulfuric acid) (or neutralizing the sulfuric acid catalyst so that the sulfuric acid does not substantially act as a catalyst). In the series of reactions, the total amount of the base (containing the amount of the base used for partial neutralization) may be selected from the range of 0.9 to 2 equivalents relative to 1 equivalent of the amount of the sulfuric acid (the fed amount of the sulfuric acid), and usually may be from 0.9 to 1.5 equivalents (e.g., from 1 to 1.5 equivalents) and preferably from 1 to 1.3 equivalents (e.g., from 1 to 1.2 equivalents).

After the hydrolyzing step (ii), in order to increase the heat resistance of the cellulose ester, if necessary, a neutralizer constituting the base [preferably an alkali metal compound and/or an alkaline earth metal compound, particularly, at least a calcium compound (e.g., calcium hydroxide)] may be added. Moreover, the reaction product may be put in water or an acetic acid-water solution or others to separate the produced cellulose ester, and the separated cellulose ester may be washed with water or others to remove a free metal component or sulfuric acid component and others. For the washing, the neutralizing agent may be used.

Thus, according to the present invention, the condition in a series of reactions comprising the acylating step and the hydrolyzing step is precisely adjusted by using the specific amounts of the sulfuric acid catalyst and acylating agent in the acylating step, and further, if necessary, hydrolyzing the specific proportions of the sulfuric acid catalyst and aqueous solvent in combination. Thereby, the cellulose ester having a high substitution degree and a remarkably narrow half height width of chemical composition as described above can be obtained.

[Cellulose Ester Film and Method for Producing Thereof]

The cellulose ester of the present invention is remarkably excellent in optical properties such as optical isotropy, and is also excellent in mechanical properties, moldability and others. Accordingly, the cellulose ester is useful for molding various molded articles (a one-dimensional molded article such as a fiber, a two-dimensional molded article such as a film, and a three-dimensional molded article). In particular, the cellulose ester is useful for forming an optical material, particularly an optical film, due to the excellent optical properties. Therefore, the cellulose ester film of the present invention comprises the cellulose ester.

The method for producing the cellulose ester film may be use a melt casting (e.g., an extrusion molding) or a solvent cast (e.g., a band casting). By using the solvent cast, the surface of the film may be improved.

In the solvent cast, the cellulose ester film may be produced by casting a dope (or an organic solvent solution) containing the cellulose ester and an organic solvent on a supporter, separating (or releasing) the film from the supporter, and drying the film.

The supporter maybe usually a metal supporter (e.g., a stainless steel), and may be a drum or an endless belt. The surface of the supporter is usually smoothed by a mirror finish in many cases.

The organic solvent for preparing the dope may be a halogen-containing organic solvent (particularly, a chlorine-containing organic solvent) or a non-halogen organic solvent (particularly, a non-chlorine organic solvent). The cellulose ester of the present invention (particularly, the cellulose acetate, that is, the cellulose triacetate) is soluble in at least the halogen-containing organic solvent (particularly, the chlorine-containing organic solvent) in many cases due to the high substitution degree. These organic solvents may be used singly or in combination. For example, the chlorine-containing organic solvent and the non-chlorine organic solvent may be used in combination. The halogen-containing organic solvent (particularly, the chlorine-containing organic solvent) may include a halogenated hydrocarbon such as dichloromethane or chloroform (particularly, a chlorinated hydrocarbon), and others. The non-halogen organic solvent (particularly, the non-chlorine organic solvent) may include an ester (e.g., an acetic acid ester such as methyl acetate, ethyl acetate, amyl acetate or butyl acetate), a ketone (e.g., a dialkyl ketone such as acetone, methyl ethyl ketone or methyl isobutyl ketone, and cyclohexanone), an ether (e.g., a chain ether such as diethyl ether, and a cyclic ether such as dioxane or tetrahydrofuran), and an alcohol (e.g., a $C_{1-4}$alkanol such as methanol, ethanol, isopropanol or n-butanol).

To the dope may be added various additives, for example, a plasticizer, a stabilizer (e.g., an antioxidant, an ultraviolet ray absorbing agent, and a degradation inhibitor or deterioration inhibitor), a lubricant (e.g., a particulate lubricant), a flame retardant, a mold-releasing agent, and others. Moreover, to the dope may be added a retardation increasing agent (e.g., a retardation increasing agent described in Japanese Patent Application Laid-Open No. 139621/2001 (JP-2001-139621A)), a release agent (e.g., a release agent described in Japanese Patent Application Laid-Open No. 309009/2002 (JP-2002-309009A)), and others.

The dope may be prepared by means of a conventional method, for example, a heating dissolution method, and a cooling dissolution method. The concentration of the cellulose ester in the dope may be from 10 to 35% by weight and preferably from 15 to 30% by weight (e.g., from 15 to 25% by weight). Moreover, in order to obtain a high-quality film (e.g., a film for LCDs), the dope may be filtered.

The dope may be solvent-cast on the supporter with the use of a casting die or others, and dried. The dope is usually solvent-cast on the supporter and pre-dried, and then the film is dried.

The thickness of the film may be selected depending on the application, and may be from 5 to 200 μm, preferably from 10 to 150 μm and more preferably from 20 to 100 μm.

According to the present invention, as described above, the retardation value of the cellulose ester film (particularly, the cellulose acetate film) can be significantly reduced at a high level. For example, in the cellulose ester film, the thickness retardation of the cellulose ester when measured as a film containing no plasticizer may be selected from the range of −50 nm to +20 nm in a film thickness of 80 μm (80000 nm), and for example, may be from −20 nm to +10 nm, preferably from −15 nm to +10 nm and more preferably from −10 nm to +5 nm. Since the retardation value (Rth) of the film depends on whether the film contains any plasticizer, the retardation value (Rth) is defined as Rth of a cellulose ester film free from a plasticizer (that is, a cellulose ester film which contains no plasticizer and comprises the cellulose ester). Moreover, the above-mentioned retardation value (Rth) can be determined through multiplication of the film thickness and the difference between the refractive index in the plane (average value) and the refractive index in the thickness direction [(the refractive index in the plane direction)−(the refractive index in the thickness direction)].

INDUSTRIAL APPLICABILITY

The cellulose ester of the present invention and the film thereof has a remarkably high optical isotropy and are extremely excellent in optical properties. Therefore, the cellulose ester and the film are utilized for various optical films, for example, a color filter, a base material film of a photosensitive photographic material, and a film for LCDs. In particular, the cellulose ester film of the present invention (particularly, the cellulose acetate film, that is, the cellulose triacetate film) is useful for a polarizer protective film (e.g., a protective film for at least one surface of a polarizing membrane, particularly for both surfaces thereof), and a viewing angle compensation film for LCDs.

EXAMPLES

The following examples are intended to describe this invention in further detail and should by no means be interpreted as defining the scope of the invention. In the following Examples and Comparative Examples, each property was measured as follows.

<Measurement of Degree of Polymerization>

A cellulose triacetate was dissolved in a mixed solution of methylene chloride/methanol of 9/1 (weight ratio) to prepare a cellulose triacetate solution having a predetermined concentration "c" (2.00 g/L). This solution was injected into an Ostward viscosimeter, and the flow time "t" (seconds) of the solution between the viscosimeter graduations was measured at 25° C. On the other hand, the blank flow time "$t_0$" (seconds) with the above mixed solvent alone was measured in the same manner as the above. The viscosity-average degree of polymerization was calculated based on the following formula.

$$\eta_{rel} = t/t_0[\eta]$$
$$= (\ln\eta_{rel})/cDP$$
$$= [\eta]/(6 \times 10^{-4})$$

In the formula, "t" shows a flow time of the solution (seconds), "$t_0$" shows a flow time of the solvent (seconds), "c" represents a cellulose triacetate concentration of the solution (g/L), $\eta_{rel}$ represents a relative viscosity, $[\eta]$ is an intrinsic viscosity, and DP is an average degree of polymerization.

<Measurements of DS, DS2, DS3 and DS6>

A sample was propionylated with propionic anhydride in pyridine solvent, and the $^{13}$C-NMR-spectrum was measured in chloroform solvent. The intensities of three acetylcarbonyl carbon signals appearing near 169.1 to 170.2 ppm were integrated. Moreover, the intensities of three propionylcarbonyl carbon signals appearing near 172.7 to 173.6 ppm were integrated. The NMR measurement conditions were as follows:

Measurement Solvent: $CDCl_3$ (3 ml was used)
Measurement temperature: 40° C.
Sample amount: 160 to 180 mg ($\phi$10 mm)
Observation nucleus: 13C (1H complete decoupling)
Number of data points: 32768
Pulse angle and time: 45°, 9 µsec
Data-uptaking time: 0.9667 sec
Waiting time: 2.0333 sec
Integrated number: 18,000

The degree of substitution (DS) was determined based on the following formula, where the integrated intensity of acetylcarbonyl carbon signals was defined as X and that of propionylcarbonyl carbon signals was defined as Y.

Degree of substitution (DS)=3×[X/(X+Y)]

In the $^{13}$C-NMR spectrum, the acetylcarbonyl carbons at 2-, 3- and 6-positions give three signals appearing near 169.1 to 170.2 ppm in the order from higher magnetic field, respectively. In each signal, the intensities in the range of ±0.2 ppm of the maximum were integrated, and the result was defined as an integrated intensity of each acetylcarbonyl carbon signal. From the following formula, DSi (i=2, 3 or 6) was determined.

DSi=DS×(integrated intensity of acetylcarbonyl carbon signal at i-position)/(total of integrated intensities of acetylcarbonyl carbon signals at 2-, 3- and 6-positions)

<Half Height Width of Chemical Composition>

Cellulose triacetate (TAC) samples (standard samples) having degrees of acetylation of 62.5%, 61.5%, 60.8% and 59.8%, respectively, were analyzed by a high-performance liquid chromatography (HPLC) under the following conditions, and the relationship between the retention time and the degree of substitution (calibration curve) was determined as a quadratic function. A specimen material was subjected to a HPLC-analysis to determine a retention time which gave the half height width, and the degree of substitution corresponding to the retention time was determined based on the calibration curve to give a half height width of chemical composition (non-correcting value) expressed in degree of substitution. The apparatus and measurement conditions in the HPLC analysis were as follows.

Apparatus: manufactured by Agilent Technology, "Agilent LC110"
Column: manufactured by Waters, "Novapak Phenyl (Waters)" 3.9 mm$\phi$×150 mm
Eluate: chloroform/methanol (9/1 (volume ratio)) (A-solution), methanol/water (8/1 (volume ratio)) (B-solution)
Gradient of A-solution/B-solution (volume ratio)=20/80 to 100/0 over 28 minutes
Flow rate: 0.7 ml/minute
Column oven: 30° C.
Detector: manufactured by Polymer Laboratories, "ELS·1000" (evaporative light scattering detector), evaporation temperature: 75° C., nebulizer temperature: 60° C., nitrogen flow volume: 0.7 l/minute
Sample solvent: chloroform/methanol (9/1 (volume ratio))
Sample concentration: 0.1% by weight
Injection amount: 20 µl In the same apparatus and conditions as the above, the half height width of chemical composition (variance) of a cellulose triacetate having an acetic acid content of 62.5% (completely acetylated cellulose) was determined in the same manner as the above. In each of cellulose triacetates obtained in Examples and Comparative Examples, the half height width of chemical composition (correcting value) was determined from the resulting variance and the non-correcting value in accordance with the above-mentioned formula (1). The cellulose triacetate having an acetic acid content of 62.5% (completely acetylated cellulose) was prepared as follows: in preparation of a cellulose triacetate in the after-mentioned Example 1, acetylation was stopped to give a product (precipitated cotton), and the product was rapidly extracted without hydrolyzing. The extracted product was used as the completely acetylated cellulose.

<Content of Calcium (Ca) Component>

A dried cellulose triacetate was completely burned, and then the resulting ash was dissolved in hydrochloric acid. After such a pretreatment, the calcium content was measured by the atomic absorption spectrometry. The measured value is obtained as the calcium content in 1 gram of the cellulose ester (cellulose triacetate) in an absolute dry condition at ppm unit.

<Amount of Residual Sulfuric Acid>

The residual sulfuric acid in the cellulose ester was determined by combusting a dried cellulose ester in an electric furnace at 1300° C., trapping the evolved sulfurous acid gas in 10% hydrogen peroxide-water, and titrating the hydrogen peroxide-water with a 0.1N sodium hydroxide solution. The data are in terms of $SO_4^{2-}$. The content of sulfuric acid is obtained as the determined value in 1 gram of the cellulose ester (cellulose triacetate) in an absolute dry condition at ppm unit.

<Retardation Value>

In a cellulose triacetate film, the refractive index (average value) in the plane direction and that in the thickness direction were measured by using an automatic birefringence analyzer (manufactured by Oji Scientific Instruments, "KOBRA-21ADH"). The film thickness (80000 nm) and the difference between these refractive indexes [(the refractive index in the plane direction)–(the refractive index in the thickness direction)] were multiplied to determine an Rth (nm).

Examples 1 to 3 and Comparative Examples 1 to 2

(Preparation of Cellulose Triacetate)

A cellulose sheet (cotton linter pulp) was treated with a disc refiner to make a flocculent cellulose. Acetic acid was sprayed on 100 parts by weight of the flocculent cellulose (moisture content: 10%) in a proportion shown in Table 1. The sprayed product was thoroughly stirred, and allowed to stand at a room temperature overnight as a pre-treatment. Predetermined amounts of acetic acid and acetic anhydride shown in Table 1 were mixed and cooled to −5° C. The cooled mixture of acetic acid and acetic anhydride was put in a twin-screw kneader reactor, and predetermined amounts of sulfuric acid and pre-treated flocculent cellulose shown in Table 1 were further added thereto and mixed. The content was adjusted at a predetermined acetylation temperature over 90 minutes, and then was subjected to an acetylation reaction for a predetermined time shown in Table 1. After the acetylation reaction, 24% by weight of magnesium acetate-water solution (and water) was added thereto so that amounts of sulfuric acid and water become predetermined amounts of hydrolyzing sulfuric acid and hydrolyzing water shown in Table 1, respectively, and the acetylation stopped with destroying the excess acetic anhydride. Thereafter, the reaction bath was regulated to a predetermined hydrolysis temperature (deacetylation temperature), and the hydrolysis was carried out (the hydrolysis was started). In Comparative Examples 1, 2, Examples 1 and 3, after hydrolyzing for 40 minutes from the hydrolysis initiation (that is after conducting the initial hydrolyzing step (ii-1) for 40 minutes), water was added so that the amount of water become a predetermined amount of hydrolyzing water shown in Table 1. After conducting the hydrolyzing for a predetermined time shown in Table 1, magnesium acetate-water solution was added thereto to completely neutralize sulfuric acid, and the reaction was stopped. The reaction bath (reaction solution) was put in 10% by weight of diluted acetic acid under stirring to precipitate a cellulose triacetate, and immersed in diluted calcium hydroxide-water solution for 15 minutes. Then, the precipitate was separated by filtration and dried to give a cellulose triacetate.

(Preparation of Film)

The obtained cellulose triacetate (12.93 g), methylene chloride (78.2 g) and methanol (6.8 g) were mixed to give a cellulose triacetate solution. The solution was filtrated through a filter paper by using a pressure filter, and then flow-cast on a glass plate to give a cellulose triacetate film having a thickness of 80 μm (80000 nm) free from a plasticizer.

Moreover, the cellulose triacetate (12.93 g), methylene chloride (78.2 g), methanol (6.8 g) and triphenyl phosphate (2.07 g) as a plasticizer were mixed to give a cellulose triacetate solution. The solution was filtrated through a filter paper by using a pressure filter, and then flow-cast on a glass plate to give a cellulose triacetate film having a thickness of 80 μm (80000 nm) (a cellulose triacetate film containing a plasticizer).

Table 1 shows the amount (content) of each component used for preparing a cellulose triacetate in each of Examples 1 to 3 and Comparative Examples 1 to 2. In addition, Table 1 shows the degree of polymerization, the degree of substitution, the total of degrees of substitution at 2- and 3-positions, the degree of substitution at 6-position, the half height width of chemical composition expressed in degree of substitution (the half height width of distribution in substitution degree of acetyl groups), the content of the calcium component, the amount of the residual sulfuric acid, and the chemical equivalent ratio (molar ratio) of the content of the calcium component relative to the amount of the residual sulfuric acid, in the obtained cellulose triacetate. Moreover, Table 1 shows the Rth (nm) of the cellulose triacetate film (a cellulose triacetate film free from a plasticizer and a cellulose triacetate film containing a plasticizer) obtained in each of Examples 1 to 3 and Comparative Examples 1 to 2.

In Table 1, the term "total DS" refers to the total of the degrees of substitution at 2-, 3- and 6-positions of a cellulose (that is, the degree of substitution), the term "DS2+DS3" refers to the total of the degrees of substitution at 2- and 3-positions, and the term "DS6" refers to the average degree of substitution at 6-position. Moreover, in Table 1, the hydrolyzing water (mol) refers to the water content (mol) relative to 100 mol of acetic acid.

TABLE 1

| | Ex. 1 | Ex. 2 | Ex. 3 | Com. Ex. 1 | Com. Ex. 2 |
|---|---|---|---|---|---|
| Cellulose (parts by weight) | 100 | 100 | 100 | 100 | 100 |
| Acetic acid for pre-treatment (parts by weight) | 74 | 74 | 74 | 69 | 76 |
| Acetic acid (parts by weight) | 428 | 428 | 428 | 396 | 396 |
| Acetic anhydride (parts by weight) | 292 | 292 | 292 | 286 | 258 |
| Sulfuric acid of catalyst (parts by weight) | 8.0 | 8.0 | 8.8 | 12.0 | 8.8 |
| Acetylation Temperature (° C.) | 41 | 41 | 40 | 38 | 38 |
| Acetylation time (minutes) | 60 | 60 | 60 | 30 | 60 |
| Hydrolyzing sulfuric acid (parts by weight) | 1.4 | 1.4 | 2.2 | 10.0 | 2.2 |
| Hydrolyzing water (first 40 minutes) (mol) | 6.6 | 6.6 | 6.6 | 12.4 | 9.9 |
| Hydrolyzing water (40 minutes or later) (mol) | 8.2 | 6.6 | 8.2 | 12.4 | 14.9 |
| Hydrolysis temperature (° C.) | 61 | 57 | 61 | 51 | 64 |
| Hydrolysis time (minutes) | 80 | 80 | 80 | 90 | 45 |
| Degree of polymerization | 303 | 312 | 312 | 313 | 353 |
| Content of Ca component (ppm) | 53 | 56 | 61 | 142 | 133 |
| Content of Ca component (mol) | 1.33 | 1.40 | 1.53 | 3.55 | 3.33 |
| Amount of residual sulfuric acid (ppm) | 58 | 62 | 68 | 323 | 151 |
| Amount of residual sulfuric acid (mol) | 0.591 | 0.632 | 0.694 | 3.295 | 1.540 |
| Ca/SO$_4$ (chemical equivalent ratio) | 2.24 | 2.21 | 2.20 | 1.08 | 2.16 |
| Total DS | 2.960 | 2.931 | 2.922 | 2.780 | 2.862 |
| DS2 + DS3 | 1.982 | 1.976 | 1.976 | 1.890 | 1.981 |

TABLE 1-continued

|  | Ex. 1 | Ex. 2 | Ex. 3 | Com. Ex. 1 | Com. Ex. 2 |
|---|---|---|---|---|---|
| DS6 | 0.978 | 0.955 | 0.946 | 0.890 | 0.881 |
| Half height width of chemical composition (correcting value) | 0.053 | 0.048 | 0.033 | 0.067 | 0.082 |
| Rth (nm) (containing plasticizer) | −6 | 4 | 9 | 88 | 41 |
| Rth (nm) (no plasticizer) | −19 | −17 | −14 | 40 | 21 |

The invention claimed is:

1. A cellulose ester having a total degree of substitution at the 2-, 3-, and 6-positions of 2.900 to 2.965, a total degree of substitution at the 2- and 3-positions of not less than 1.97, and a half height width of a distribution in degree of substitution of not more than 0.07, wherein said cellulose ester is a cellulose $C_{2-6}$acyl ester, and wherein the half height width is determined by converting a retention time of the cellulose ester, said retention time being measured by high-performance liquid chromatography (HPLC), into a degree of substitution to obtain an uncorrected half height width, and by further converting the uncorrected half height width to a corrected half height width in accordance with the following equation:

$$Z = (X^2 - Y^2)^{1/2}$$

wherein Z is the corrected half height width, X is the uncorrected half height width determined by HPLC, and Y is the half height width for a cellulose ester having a degree of substitution of 3.0 determined by HPLC.

2. The cellulose ester according to claim 1, which is a cellulose acetate.

3. The cellulose ester according to claim 1, wherein the total degree of substitution at the 2-, 3-, and 6-positions is from 2.910 to 2.963, the total degree of substitution at the 2- and 3-positions is not less than 1.973, and the half height width of the distribution in degree of substitution is not more than 0.065.

4. The cellulose ester according to claim 1, which is a cellulose acetate, wherein the total degree of substitution is from 2.915 to 2.962, the total degree of substitution at the 2- and 3-positions is not less than 1.975, and the half height width of the distribution in degree of substitution is not more than 0.060.

5. The method for producing a cellulose ester recited in claim 1, which comprises
   (i) an acylating step for acylating a cellulose with an acylating agent in the presence of a sulfuric acid catalyst, and
   (ii) a hydrolyzing step for hydrolyzing the acylated product in the presence of a sulfuric acid catalyst,
   wherein, the acylating step (i) is conducted by using from 1.40 to 2.0 molar equivalents of the acylating agent relative to 1 mol of a hydroxyl group in the cellulose in the presence of from 6.5 to 9.5 parts by weight of the sulfuric acid catalyst relative to 100 parts by weight of the cellulose, and
   the hydrolyzing step (ii) at least comprises (ii-1) an initial hydrolyzing step for hydrolyzing the acylated product in the presence of not more than 3 parts by weight of the sulfuric acid catalyst relative to 100 parts by weight of the cellulose and in the presence of 4 to 9 mol of an aqueous solvent relative to 100 mol of an organic carboxylic acid corresponding to the acylating agent.

6. The method according to claim 5, wherein, in the initial hydrolyzing step (ii-1), the hydrolysis is conducted for not shorter than 20 minutes from initiation of the hydrolysis reaction.

7. A method for producing a cellulose ester recited in claim 2, which comprises
   (i) an acetylating step for acetylating a cellulose in acetic acid with acetic anhydride in the presence of a sulfuric acid catalyst, and
   (ii) a hydrolyzing step for hydrolyzing the acetylated product in the presence of a sulfuric acid catalyst,
   wherein (1) in the acetylating step (i), the amount of the sulfuric acid catalyst is from 7 to 9.2 parts by weight relative to 100 parts by weight of the cellulose, and the amount of the acetic anhydride is from 1.45 to 1.9 molar equivalents relative to 1 mol of a hydroxyl group in the cellulose, and
   (2) the hydrolyzing step (ii) at least comprises (ii-1) an initial hydrolyzing step for hydrolyzing the acetylated product in the presence of not more than 2.5 parts by weight of the sulfuric acid catalyst relative to 100 parts by weight of the cellulose and in the presence of 4.5 to 8 mol of water relative to 100 mol of the acetic acid for not shorter than 30 minutes from initiation of the hydrolysis reaction.

8. A method for producing a cellulose ester recited in claim 2, which comprises
   (i) an acetylating step for acetylating a cellulose in acetic acid with acetic anhydride in the presence of a sulfuric acid catalyst,
   a step for partially neutralizing the sulfuric acid catalyst by addition of a basic aqueous solution, and
   (ii) a hydrolyzing step for hydrolyzing the acetylated product in the presence of a sulfuric acid catalyst,
   wherein (1) in the acetylating step (i), the amount of the sulfuric acid catalyst is from 7.5 to 9 parts by weight relative to 100 parts by weight of the cellulose, and the amount of the acetic anhydride is from 1.5 to 1.8 molar equivalents relative to 1 mol of a hydroxyl group in the cellulose, and
   (2) the hydrolyzing step (ii) at least comprises (ii-1) an initial hydrolyzing step for hydrolyzing the acetylated product in the presence of 0.8 to 2.4 parts by weight of the sulfuric acid catalyst relative to 100 parts by weight of the cellulose and in the presence of 5.5 to 7.5 mol of water relative to 100 mol of the acetic acid for 30 minutes to 2 hours from initiation of the hydrolysis reaction.

9. A cellulose ester film comprising a cellulose ester recited in claim 1.

10. The cellulose ester film according to claim 9, wherein the cellulose ester possesses a thickness retardation of −20 nm to +10 nm when measured as a film with a thickness of 80 μm containing no plasticizer.

11. The cellulose ester film according to claims 9 or 10, which is a viewing angle compensation film for liquid crystal displays or a polarizer protective film.

* * * * *